United States Patent [19]

Krug et al.

[11] Patent Number: 5,642,393
[45] Date of Patent: Jun. 24, 1997

[54] DETECTING CONTRABAND BY EMPLOYING INTERACTIVE MULTIPROBE TOMOGRAPHY

[75] Inventors: Kristoph D. Krug, Framingham; Michael Ellenbogen, West Newton; Paul J. Hurd, Norfolk; John O. Tortora, Westford, all of Mass.

[73] Assignee: Vivid Technologies, Inc., Waltham, Mass.

[21] Appl. No.: 533,956

[22] Filed: Sep. 26, 1995

[51] Int. Cl.$^6$ ................................................ G01N 23/04
[52] U.S. Cl. ................................ 378/57; 378/90; 378/53
[58] Field of Search ................................ 378/57, 51, 53, 378/54, 86, 88, 89, 90

[56] References Cited

U.S. PATENT DOCUMENTS

| | | |
|---|---|---|
| 4,884,289 | 11/1989 | Glockmann et al. . |
| 5,007,072 | 4/1991 | Jenkins et al. . |
| 5,022,062 | 6/1991 | Annis . |
| 5,175,756 | 12/1992 | Pongratz et al. ............ 378/57 X |
| 5,182,764 | 1/1993 | Peschmann et al. ............ 378/57 |
| 5,247,561 | 9/1993 | Kotowski . |
| 5,260,981 | 11/1993 | Uyama . |
| 5,319,547 | 6/1994 | Krug et al. . |
| 5,394,454 | 2/1995 | Harding . |

OTHER PUBLICATIONS

Troy, "Laser–Based Imaging System Bares All", *Photonics Technology World*, Jul. 1995.

Falconer et al., "Detection of chemical contraband using spectroscopic microwave imaging", *SPIE*, 2093: 301–309, 1994. No Month.

Speller et al., "X–ray scattering signatures for material identification", *SPIE*, 2092: 366–377, 1993. No Month.

Luggar et al., "Industrial potential of Rayleigh scattered X–rays for identification of low–Z materials", *SPIE*, 2092: 378–386, 1993. No Month.

Martens et al., "Coherent X–ray scatter imaging for foodstuff contamination detection", *SPIE*, 2092: 387–398, 1993. No Month.

Strecker et al., "Detection of Explosives in Airport Baggage Using Coherent X–Ray Scatter", *SPIE*, 2092: 399–410, 1993. No Month.

Batchelder et al., "Raman Microscopy and Direct 2–D Imaging of Explosives and Drugs", *Proceedings of Contraband and Cargo Inspection Technology International Symposium*, pp. 73–75, Oct. 1992.

Carleton et al., "Detection of Narcotics and Explosives by Surface–Enhanced Raman Spectroscopy", *Proceedings of Contraband and Cargo Inspection Technology International Symposium*, pp. 401–407, Oct. 1992.

(List continued on next page.)

*Primary Examiner*—David P. Porta
*Attorney, Agent, or Firm*—Fish & Richardson, P.C.

[57] ABSTRACT

An inspection system for detecting a specific material of interest in items of baggage or packages includes a multi-view X-ray inspection probe and one or more material sensitive probes. The multi-view X-ray inspection probe employs X-ray radiation transmitted through or scattered from an examined item to identify a suspicious region inside the item. An interface is used to receive from said X-ray inspection probe X-ray data providing spatial information about the suspicious region and to provide this information to a selected material sensitive probe. The material sensitive probe then acquires material specific information about the previously-identified suspicious region and provides it to a computer. The computer uses a high level detection algorithm to identify presence of the specific material in the suspicious region. The material sensitive probe may be a directional probe such as a coherent scatter probe, or a non-directional probe such as a Compton scatter probe or an NQR probe. The detection algorithm can automatically employ the different probes operating in a preferred geometry. The inspection system may also include a graphical interface and an operator interface that enable interactive communication with the detection algorithm.

39 Claims, 7 Drawing Sheets

OTHER PUBLICATIONS

Sheen et al., "Near–field millimeter–wave imaging for weapon detection", *SPIE*, 1824: 223–233, 1992. No Month.

Henderson et al., "Fourier–Transform Infrared Spectroscopy Applied to Explosive Vapor Detection", *Proceedings of the First International Symposium on Explosive Detection Technology*, pp. 604–617, Nov. 1991.

Seward et al., "Explosive Detection Using Dielectrometry", *Proceedings of the First International Symposium on Explosive Detection Technology*, pp. 441–453, Nov. 1991.

Fan Beam X–Ray Bone Densitometer, Hologic Inc. Technical Manual, 1995. No Month.

Cullity, *Elements of X–Ray Diffraction*, Addison–Wesley Publishing Co., Chapter 7, 1978.

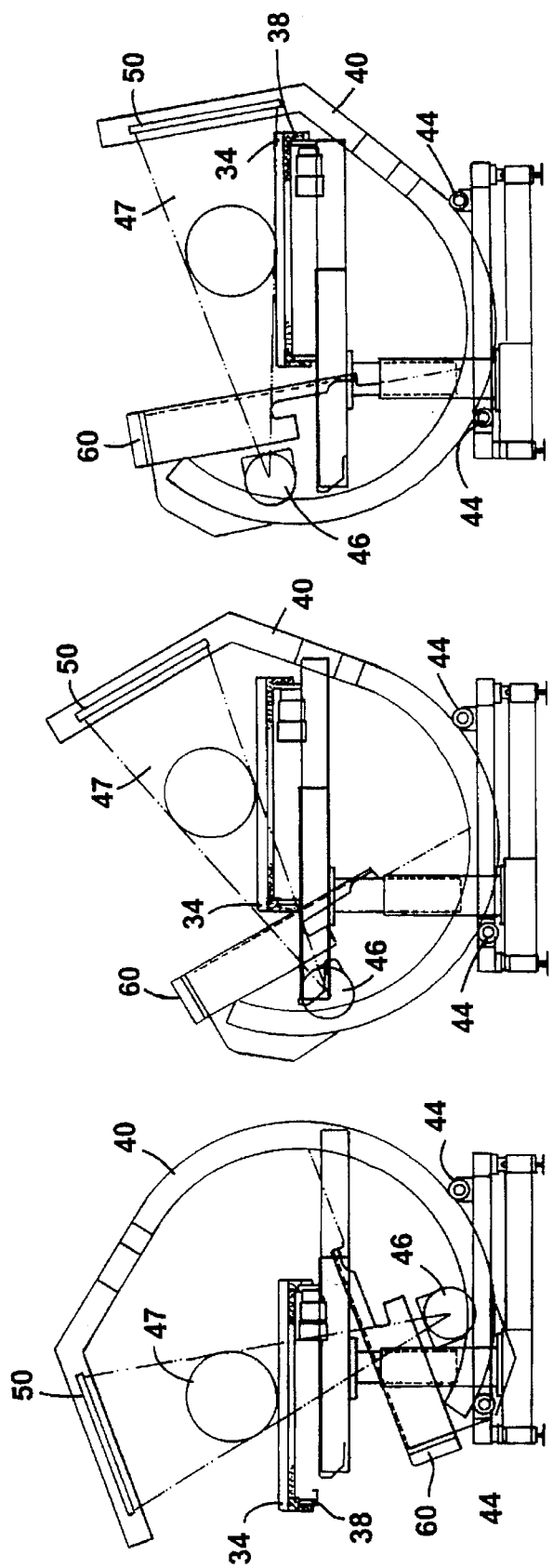

DETECTING CONTRABAND BY EMPLOYING INTERACTIVE MULTIPROBE TOMOGRAPHY

The present invention relates to interactive, flexible geometry, multiprobe inspection systems for examination of packages or baggage.

BACKGROUND OF THE INVENTION

Over the past several years, X-ray baggage inspection systems have evolved from simple x-ray imaging systems that were completely dependent on interpretation by an operator to more sophisticated automatic systems that can automatically recognize certain types of contraband. The more sophisticated inspection systems have employed single energy or dual energy X-ray radiation transmitted through or scattered from the examined baggage. Some systems have used a single view source detector arrangement, others have utilized a dual view or multi-view arrangements. The single or dual view systems usually scan baggage, as it moves on a conveyor, using a fan beam or a scanning pencil beam of X-rays in a fixed geometry. The multiview, Computed Tomography (CT) type systems usually scan stationary baggage in a fixed geometry of scan angles and process data corresponding to absorption of X-rays to reconstruct selected slices of the baggage.

At airports, the baggage inspection procedure is divided into at least three levels of inspection. A 'level 1' system processes baggage rapidly, ideally at a rate of up to 1500 bags per hour. This system is located at a first inspection station and inspects all baggage; as such, it represents the first line of defense. The system rapidly scans baggage and automatically makes a decision based on its particular modes of detection and methodology. This methodology may be object based, e.g., mass density, effective atomic number ($Z_{eff}$), or Compton X-ray scatter, or it may be bag-based, such as Nuclear Quadrupole Resonance (NQR), ion mass spectroscopy, vapor chemi-luminescence, or other techniques. Such systems are able, to some degree, to rapidly eliminate "clean" and non-suspicious baggage from the stream of passenger baggage and have been proven effective in detecting real threats. The number of bags that cannot be cleared at level 1 can range from 10% to 50% of the total number of bags. The clearing efficiency depends on the particular detection methodology and threat thresholds used in the system.

The rejected (i.e., non-cleared) bags are automatically sent to a 'level 2' area. In the 'level 2' area, an operator usually visually inspects an x-ray image of the rejected bag and attempts to determine whether a suspicious object inside the bag can be cleared based on its obvious shape. The operator searches the image for characteristic objects such as weapons, timing and detonation devices, wires, or other characteristics associated with contraband. The operator at this station can clear most, but not all of the rejected bags. The remaining baggage, which is usually 0.1% to 0.5% of the initial stream, is then sent on to a 'level 3' inspection station which is usually a slower inspection device that uses a different technology.

Vapor or trace detectors (also called 'sniffers') and CT scanners have been used as 'level 3' devices. A vapor or trace detector does not employ a penetrating type of radiation, but looks for traces of characteristic materials. It was suggested that, by careful placement inside a bag, a relatively large amount of explosives can pass undetected by the trace device. On the other hand, a CT scanner, which of course employs penetrating X-ray radiation, is usually successful in identifying explosives inside a bag especially when present in a large amount. The CT scanner basically measures a single parameter, that is, the mass density of the examined object. The CT scanner can be set up to communicate with the 'level 1' device in order to interrogate a specific object identified within the baggage by that device. If a 'level 1' X-ray scanner identifies threats on the basis of effective atomic number ($Z_{eff}$) the additional density information from the CT scanner can significantly reduce the false alarm rate, but may not be able to eliminate it completely. However, CT scanners can be very expensive considering the low utilization at a 'level 3' station.

On average, 'level 3' devices clear less than half of the inspected objects, yielding 0.05% to 0.25% of the baggage to be sent to 'level 4'. 'Level 4' is defined as reconciliation with the owner. The reconciliation is often difficult, if not impossible. When the reconciliation is not possible the bag is confiscated, which causes a complaint from an unhappy passenger.

While the above system can perform successfully, there is still a need for a relatively low cost X-ray inspection device that can reliably detect various explosives (or other contraband) having different shapes and being located anywhere in the examined baggage. Such a device should have a high confidence and a low false alarm rate.

SUMMARY OF THE INVENTION

In general, the inspection system detects different types of contraband (e.g., explosives, drugs, money) in items of baggage or packages by one or more material sensitive probes deployed on an arm or scanner that is positioned mechanically to examine the item of luggage with many different and programmable views including radial and axial views. The inspection system includes an X-ray probe that has an x-ray source and a detection system with one or more detector arrays. The x-ray source and the detector arrays are constructed to move together in a coordinated fashion. Thus the X-ray probe can take CT type data and can also reconstruct cross-sectional and mass density information. The X-ray probe also includes programmable collimation and filtering to generate filtered pencil beams for Rayleigh and Compton scattering measurements. Dual energy x-ray projection data can be taken by setting one of several fan beam collimators and scanning along a linear axis. The detection system includes an array of dual energy transmission detectors and Rayleigh scattering detectors with programmable collimation. The detection system may also include arrays of Compton scatter detectors mounted on the scanning head and under the table holding the inspected item.

The inspection system includes several different modes of detection operating in conjunction with an expert system of computer software and detection algorithms to effect a very high confidence x-ray scanner for explosives detection in luggage. The inspection system may also include a graphical interface and an operator interface that enable interactive communication with the detection algorithm.

In general, an X-ray inspection method of detecting a specific material of interest in items of baggage or packages includes employing X-ray radiation transmitted through or scattered from a examined item to obtain multi-view spatial information about the examined item, identifying from the spatial information a suspicious region inside the item, employing a material sensitive probe to acquire material specific information about the suspicious region, and identifying, based on computer-processing, presence of the specific material in the suspicious region.

The material sensitive probe may utilize a Compton scattered X-ray radiation, a Raman spectrum, an infrared spectrum, the nuclear quadrupole resonance effect, a wave of microwave energy modified by dielectric material property, or reflected millimeter wave (microwave) field. The material sensitive probe may have directional properties such as a coherent scatter probe.

X-ray radiation is employed by exposing the examined item at multiple locations to a fan beam of X-rays, detecting X-ray radiation transmitted through or scattered from the examined item, and processing the detected X-ray data to identify the suspicious region. The detection is performed by detecting X-ray radiation transmitted through, back-scattered or forward-scattered from the examined item.

The introduced X-ray radiation may be a fan beam or a pencil beam generated at least one energy.

The detection of coherently scattered X-rays may be performed by employing a position sensitive or an energy sensitive X-ray detector.

BRIEF DESCRIPTION OF THE DRAWINGS

FIGS. 3A, 3B, and 3C are cross-sectional views of the inspection device of FIG. 2 at different angles of operation.

DESCRIPTION OF THE PREFERRED EMBODIMENTS

Figure 1:
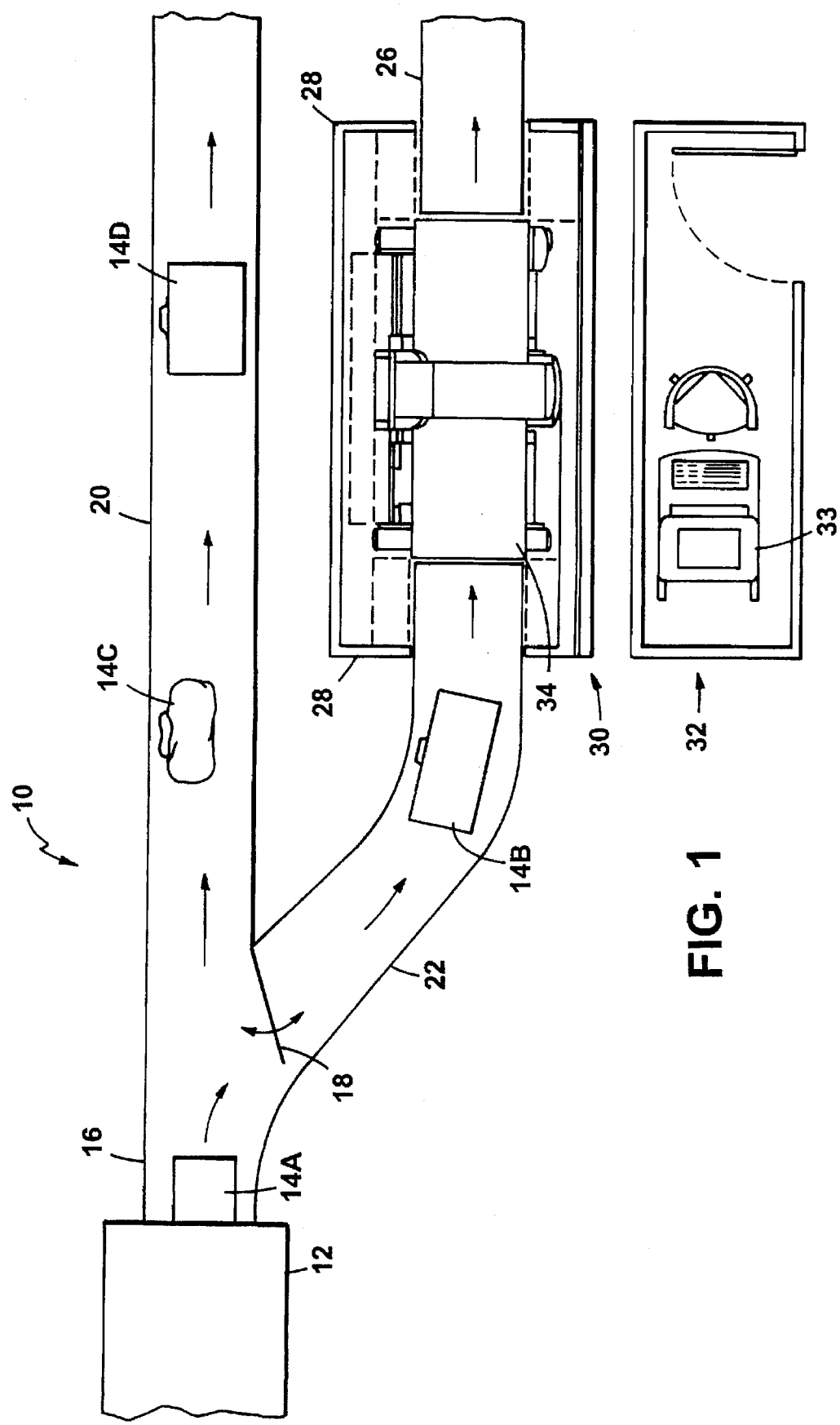
FIG. 1 is a schematic top view of a baggage inspection system employing two x-ray inspection devices.

Referring to FIG. 1, an X-ray inspection system 10 includes a level one x-ray inspection device 12, such as VIVID Rapid Detection System (available from Vivid Technologies, Inc., Waltham, Mass.), which examines items of baggage being transported on a conveyor 16. When device 12 examines an item of baggage 14A and evaluates the item as free of regions that could contain contraband, the item is automatically directed by a baggage pusher 18 to proceed further on conveyor 20. If device 12 detects possible presence of contraband, pusher 18 directs baggage 14B to conveyor 22 that transports the baggage to an X-ray inspection device 30, such as a modified version of a QDR 4500 scanner (available from Hologic, Inc., Waltham, Mass.). An operator located at a remote location 32 can oversee the entire inspection process, evaluate data detected and processed by inspection device 12 and direct operation of inspection device 30.

Figure 2:
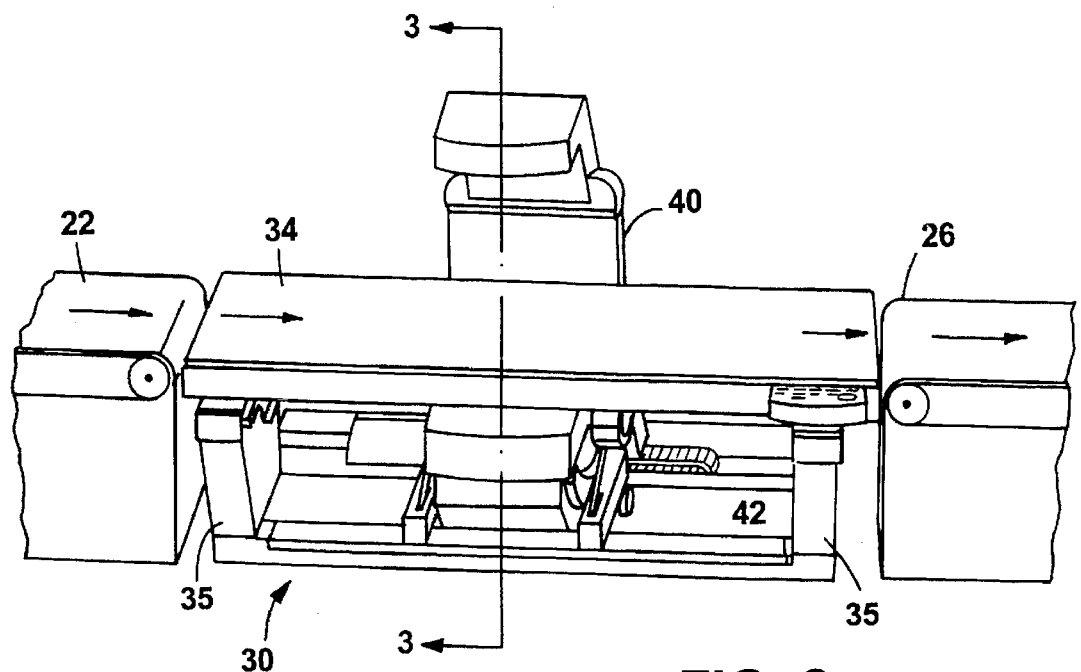
FIGS. 2 shows a schematic side view of an x-ray inspection device employed in the system of FIG. 1.
Figure 3:
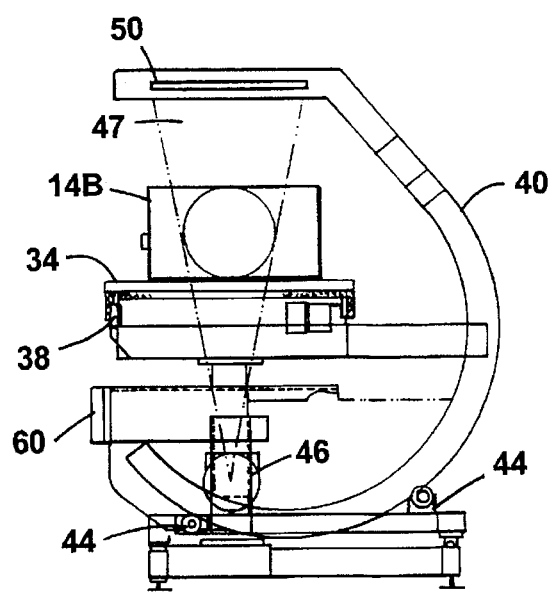
FIG. 3 shows a cross-sectional view of the inspection device of FIG. 2.

Referring to FIGS. 2 and 3, X-ray inspection device 30, enclosed in shielding 28 (FIG. 1), includes several material sensitive probes. These probes are located on a C-arm 40, which utilizes displacement subsystems 42 and 44 to move linearly along or to rotate relative to a moving platform 34 and a frame 35. A first probe utilizes polychromatic X-ray radiation to scan baggage 14B at several angles to locate suspicious objects or regions. Based on multi-view X-ray transmission data, the first probe creates images of article surrounding the suspicious objects or regions and also identifies the best examination geometry for a second stage probe.

The system uses several different probes with directional or non-directional properties in the second stage of examination. A preferred directional probe employs the X-ray diffraction technique using the geometry provided by the first probe. Other second stage probes utilize Raman spectroscopy, infrared spectroscopy, NQR, or microwave imaging as will be described below.

Figure 4:
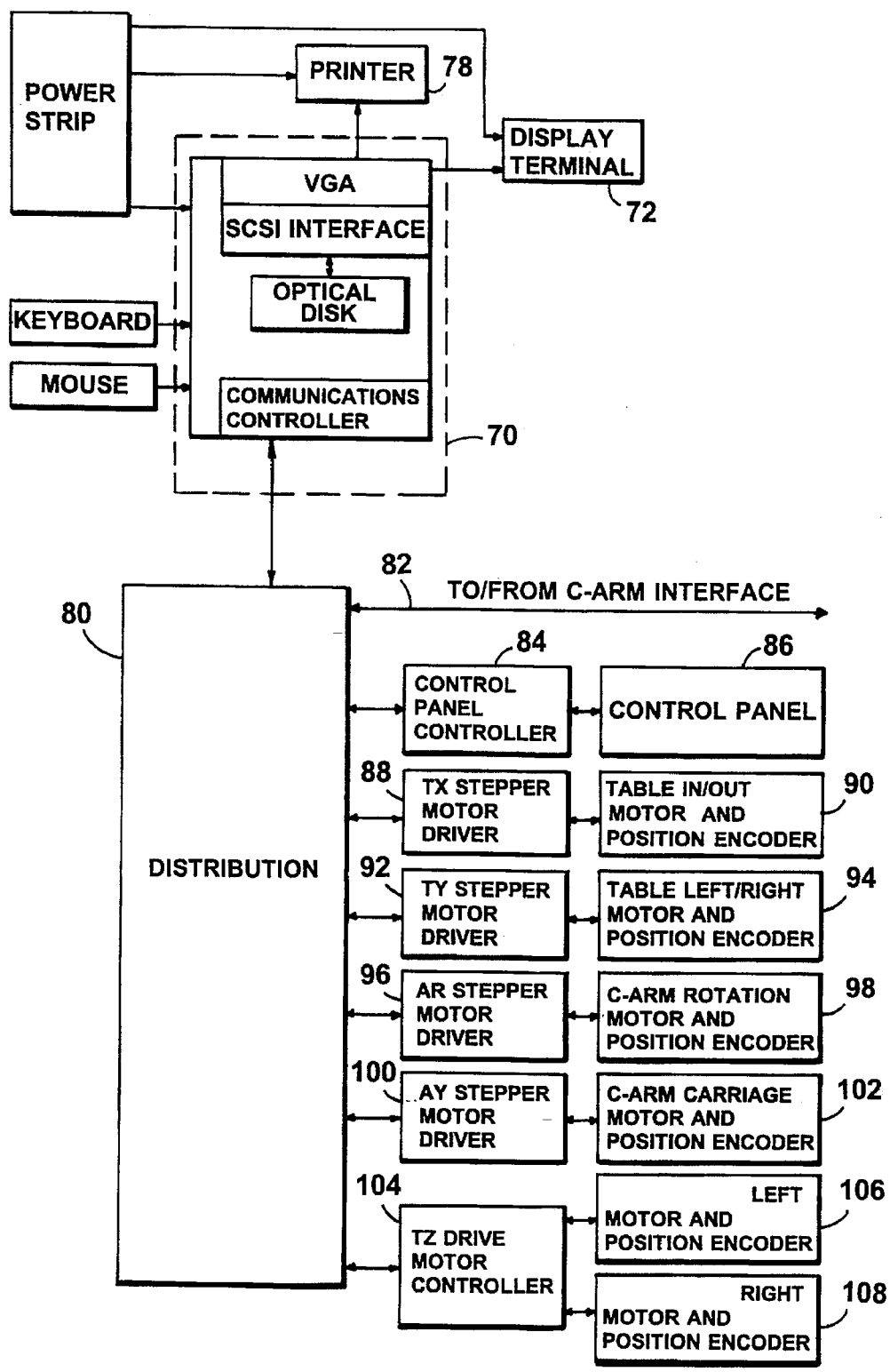
FIGS. 4, 4A, 4B and 4C are block diagrams of the device of FIG. 2.
Figure 4A:
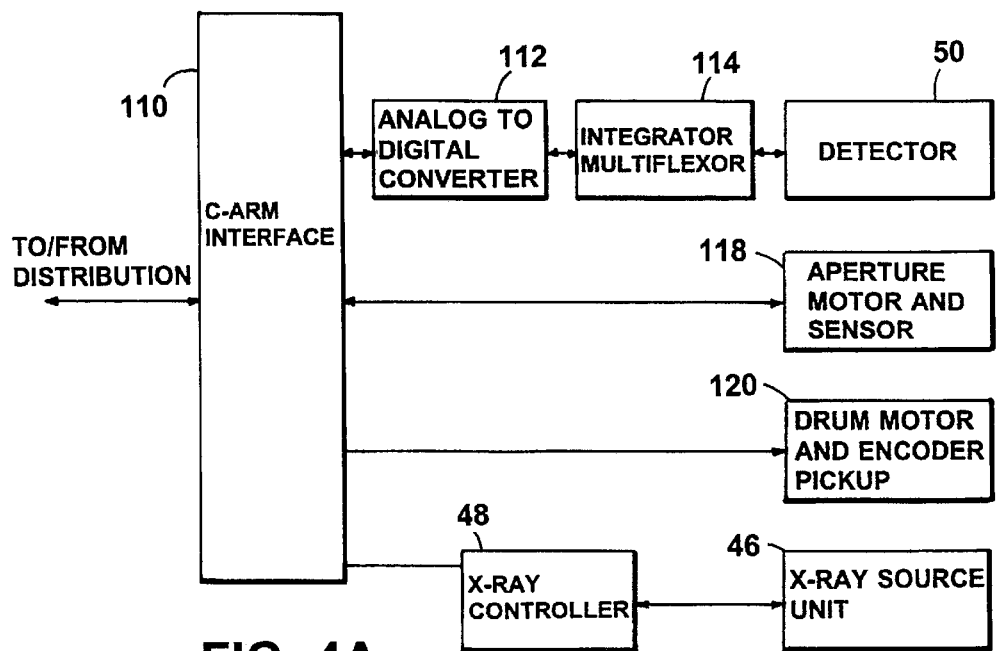

The first, multiview, polychromatic X-ray probe includes an x-ray source subsystem 46, an X-ray detector subsystem 50 and the corresponding electronics shown diagrammatically FIG. 4A. X-ray source subsystem 46 has an X-Ray tube, a collimator and an X-ray controller 48 that includes an X-Ray tube filament transformer, a high voltage rectifier circuit, and sensing circuits that monitor the high voltage applied to the x-ray tube and the beam current. The X-ray controller, which can operate both in pulsed mode or in a continuous mode, triggers the X-ray source (e.g., a tungsten X-ray tube) that can produce a beam of X-rays at high and low energy bands. (A suitable X-ray controller is disclosed in U.S. Pat. No. 5,319,547, which is incorporated by reference.) The emitted X-ray radiation is collimated by the collimator to create a fan beam of X-ray radiation 47.

X-ray detector subsystem 50 includes 72 scintillating $CdWO_4$ crystals, each optically coupled to one photodiode. Each photodiode detects light emitted the corresponding crystal and converts the light into current, which is amplified in a current-to-voltage converter. Output from the amplifier is applied to an integrator through analog switches. The analog switches, which operate in parallel, are turned on during the X-ray pulse and turned off during the integrator hold time to prevent integrating noise into the data. The control signal that turns these switches on and off is supplied from an integrator/multiplexor board 114.

Integrator/multiplexor board 114 sends the analog signals to an analog-to-digital (ADC) board 112 for conversion to a digital format. The analog signals from integrator/multiplexor board 114 are applied to differential amplifiers on ADC board 112 in four groups of up to 64 channels. Outputs from the differential amplifiers are combined in a final multiplexor consisting of four analog switches. The multiplexed signals pass through a programmable gain amplifier and summing amplifier before being applied to the A/D converter. The A/D converter converts the analog signal into 16 bit parallel data for processing by a digital signal processor, e.g., Motorola 56000. The digital signal processor generates all the control signals necessary for the detector array assembly. This processor also provides a high speed serial data link to computer 70.

Also referring to FIG. 4, inspection device 30 also includes a computer 70, which controls and commands the hardware. Computer 70 is connected to a distribution board 80, which provides interconnections between an operator's console 33, C-arm interface 110 (FIGS. 4A, 4B or 4C), control panel controller 84 and displacement subsystem 42 and 44. Control panel controller 84 interfaces a control panel 86 to operator's console 33. Control panel 86 provides switches including visual indicators for moving C-arm 40 and platform 34. Linear displacement subsystem 42 includes TX and TY stepper motors and a rotational subsystem 44 includes C-arm rotation motor 98 and a C-arm carriage motor 102. TX stepper motor driver 88 controls the motion of platform 34 using a driver motor 90 based on commands from computer 70. A position encoder associated with motor 90 provides position monitoring. TY stepper motor 94 and associated driver 92 provides the motion of platform 34 in the direction of baggage movement and its position is tracked by an associated position encoder. An AR stepper motor driver 96 controls the rotation of C-arm 40, which is moved by a C-arm rotation motor 98 and its position controlled with an associated position and coder. A C-arm 40 carriage motor 102 moves C-arm 40 linearly and an associated position encoder provides position monitoring. The left or right movement of C-arm 40 is controlled by an AY stepper motor driver 100. A platform motor raises or lowers platform 34 and the corresponding position encoder provides position monitoring. The motion of motor 106 is controlled by a DZ drive motor controller 104.

Device 30 is interfaced to a ISA Bus computer to control table and C-arm movement and X-ray generation, perform all necessary calculations, and manage baggage and database information. The system uses a computer with a pentium processor, a 16 Mb of memory and a super VGA video card.

Figure 5:
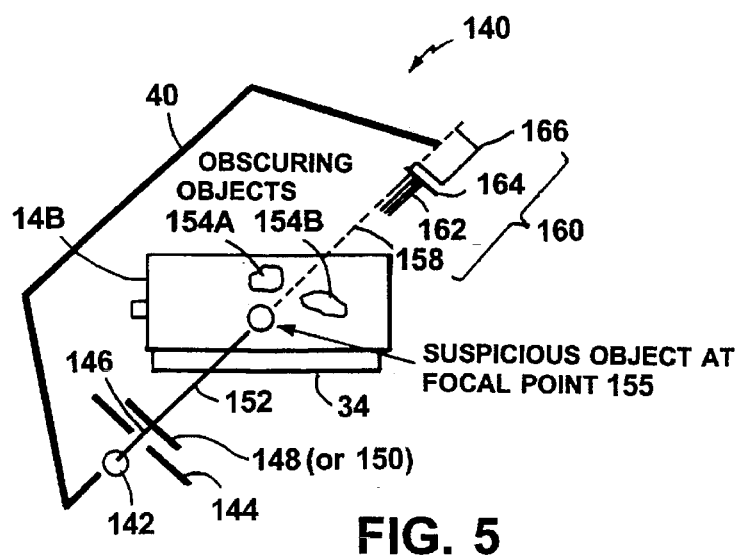
FIG. 5 shows diagrammatically an coherent scatter X-ray probe employed in the device of FIG. 2.

Referring to FIG. 5, the second probe, which is a coherent (Rayleigh) x-ray scatter probe 140 is also located on C-arm 40. Coherent x-ray scatter probe 140 includes a polychromatic X-ray source 142 emitting X-ray radiation collimated by a pencil beam collimator 144. X-ray source 142 shares the tungsten X-ray tube with X-ray source 142 of the first probe. (Alternatively, X-ray source 142 uses a separate X-ray tube.) Collimator 144 is located on and controlled by aperture motor and sensor 118 (FIG. 4A). Pencil beam 146 is filtered by an erbium filter 148 or a thulium Ross filter 150 before it irradiates the examined object (155). Filtered X-ray beam 152 is scattered by the examined object and the characteristic radiation (158) is detected by a coherent scatter X-ray detection subsystem 160. Detection subsystem 160 includes a collimator 162 limiting the view angle of the X-ray detector. The X-ray detector includes a position sensitive PMT 166, which detects spatial location of optical radiation emitted from a NaI scintillating crystal 164. The detection geometry was selected to substantially avoid interaction of other obscuring, objects (154a, 154b) with the probe beam.

This probe uses a technique utilizing as a Ross filter, also called a balanced filter, and was described by B. D. Cullity in "Elements of X-Ray Diffraction" Addison-Wesley Publishing Company, Inc., 1978. Since the filters (148 and 150) are made of two different substances differing in atomic number by one, then they have the same relative attenuation at every wavelength except for the narrow band of wavelengths between the K edges of the two substances. When the diffraction pattern from a substance is measured first with one filter and then with the other filter, the difference between the two measured diffraction patterns yields the diffraction pattern corresponding to a nearly monochromatic beam with an energy at the K edge. Advantageously, this measurement does not require determination of the photon energy of the coherently scattered X-rays. The employed filters have K edges respectively just below (57.43 Kev) and just above (59.32 Kev) the characteristic $K_\alpha$ of tungsten (58.87 Kev). Thus, their band pass region coincides precisely with the strongest emission band of tungsten. The detailed balancing of attenuation between the two filters is accomplished by a physical balancing of the relative thickness of the two filters or by the detection software.

In another embodiment, the coherent x-ray scatter probe 140 measures accurately the energy spectrum of the scattered photons at several different locations. The probe measures the entire energy spectrum or only selected energies corresponding to selected materials. It utilizes different types of coherent x-ray scatter measurements described in the prior art (see (1) Strecker, H., Harding, G., Bomsdorf, H., Kanzenbach, J., Linde, R., Martens, G. "Detection of explosives in airport baggage using coherent X-ray scatter." SPIE vol.2092 Substance Detection Systems 399–410 1993; (2) Luggar, R. D., Gilboy, W. B., MacCuaig, N., "Industrial potential of Rayleigh scattered X-rays for identification of low-Z materials", SPIE Vol. 2092 Substance Detection Systems, pp. 378–386, 1993; (3) Speller, R. D., Horrock, J. A., Lacey, R., "X-Ray scattering signatures for material identification" SPIE vol. 2092 Substance Detection Systems, pp. 366–377, 1993; and (4) Luggar, R. D., Horrocks, J. A., Speller, R. D., Royle, G. J., Lacey, R. "Optimization of a low angle x-ray scatter system for explosive detection" all of which are incorporated by reference).

Figure 4B:
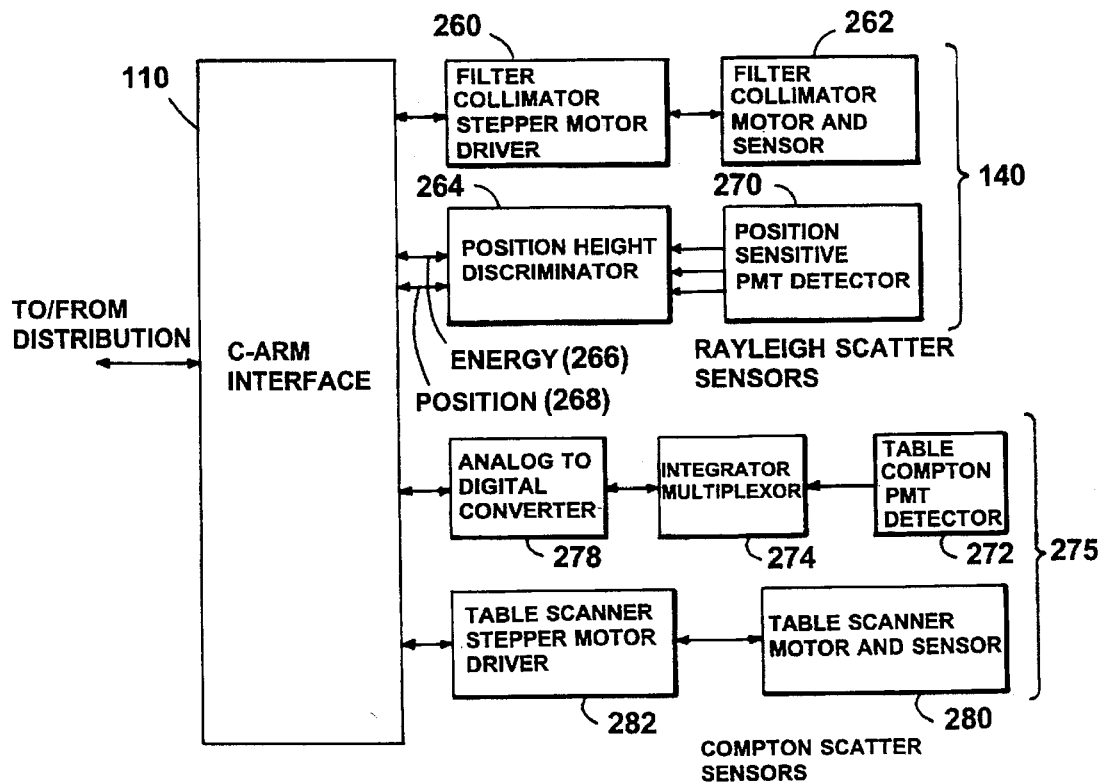

FIG. 4B shows diagrammatically an interface for both coherent (Rayleigh) scatter probe 140 and a Compton scatter probe 275. A switchable filter/collimator subsystem includes a filter/collimator motor and sensor 262 controlled by a filter/collimator driver 260. The filter/collimator subsystem selectively position K-edge filtration and a foil collimation system into X-ray beam 146 to enable optimum detection of a selected material. The scattered radiation is detected by detection subsystem 160 that includes position sensitive detector (i.e., scintillating crystal 164 and PMT 166 of FIG. 5) with the corresponding electronics 270 and a position/height discriminator 264. Rayleigh detection subsystem 160 is capable of discriminating the position (268) and energy (266) of each interacting event. The position and energy data are sent to a computer via C-aram interface 110.

Compton scatter probe 275 includes a array of PMT detectors and the corresponding electronics (272) mounted underneath table 34. The scatter array, constructed as described in the above-referenced patent application, is moved to a desired position by motor 280 controlled by driver 282. The scatter array programmably scans along the axial axis of the examined item to reconstruct a 2-dimensional map of back-scattered X-ray radiation. Forward-scattered X-ray radiation is detected by an additional forward-scatter array, or the Rayleigh detection subsystem is set to detect Compton scatter.

Figure 6:
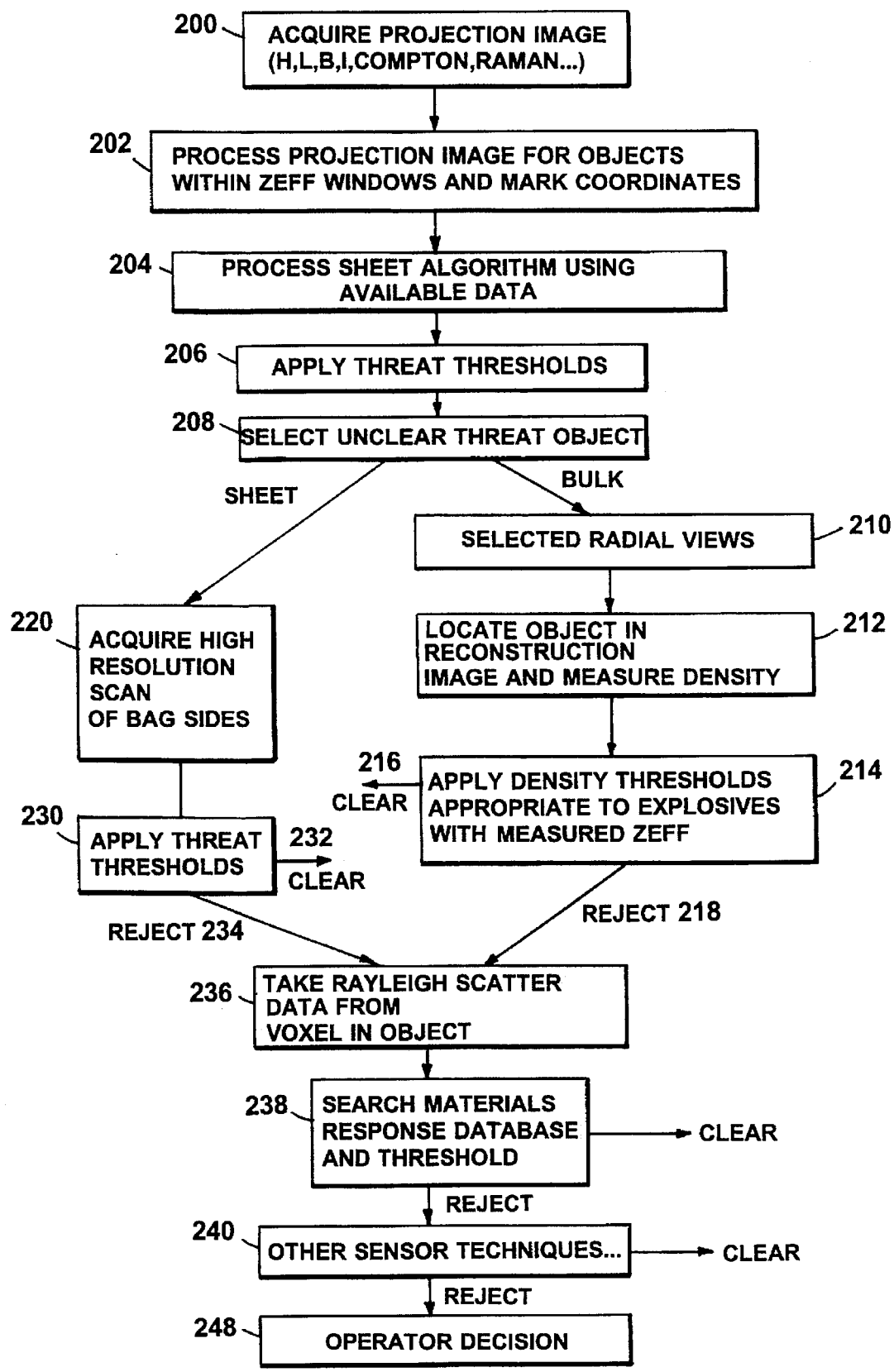
FIG. 6 is a flow diagram of operation of the device of FIG. 2.

FIG. 6 shows diagrammatically the operation of inspection device 30. First, the multiview, polychroimatic X-ray probe acquires projection image data (absorption and scatter X-ray data H and L, and transformed data B and I) in a similar way as is done by a 'level 1' X-ray scanner (200). For example, see U.S. patent application Ser. No. 08/533,646, filed Sep. 25, 1995, entitled "DETECTING EXPLOSIVES OR OTHER CONTRABAND BY EMPLOYING TRANSMITTED AND SCATTERED X-RAY" which is incorporated by reference as if fully set forth herein). By employing the detection algorithms described in the above-cited application, the polychromatic X-ray probe detects objects within the $Z_{eff}$ window that could contain a threat material (202) and also runs sheet algorithms (204) to identify sheets of a threat material. Then the probe identifies the coordinates of the individual objects and performs a recognition on each object (206). Objects that are identified as free of any threat (or contraband) are cleared and the remaining objects are further examined depending on their shape (208).

The probe further examines the bulk objects that were rejected (i.e., uncleared) by taking selected radial views (210). The algorithm forms a reconstruction image and locates the objects in the image. Then the algorithm measures the density of these objects (212). The threat decision is automatically made based on a selected density threshold (214). Objects outside of this threshold are cleared (216) and the others (218) need further processing by a second probe, such as the coherent scatter probe (236). This bulk algorithm is faster than a standard CT algorithm since the probe takes only a limited number of the radial views of objects that could not be cleared by the 'level 1' examination (steps 200 to 208). The cleared objects are no longer examined.

The probe also examines the identified sheet objects by taking high resolution side views of these objects (220). Usually, the sheet objects are found in the walls of a examined suitcase or bag. Then the algorithm applies a selected threat routine (230) to clear objects free of explosives (or other investigated contraband). Alternatively, the X-ray probe can here employ only the Compton Scatter technique to examine the walls of a examined suitcase, as is described in the above-referenced patent application.

As described above, the second probe employs coherent (Rayleigh) X-ray scatter to further inspect the objects that could not be cleared (236). The coherent scatter probe receives coordinates of suspicious objects and other obscuring objects and identifies the best geometry for examination. The probe accumulates X-ray data at different positions and of different energies characteristic of the irradiated material. The probe makes a threat decision by comparing the acquired data to a database of explosives (or other contraband) (238). If there is an object that could not be cleared, another probe such as a Raman probe, an infrared probe, a microwave probe, or an NQR probe may be employed (240).

Figure 4C:
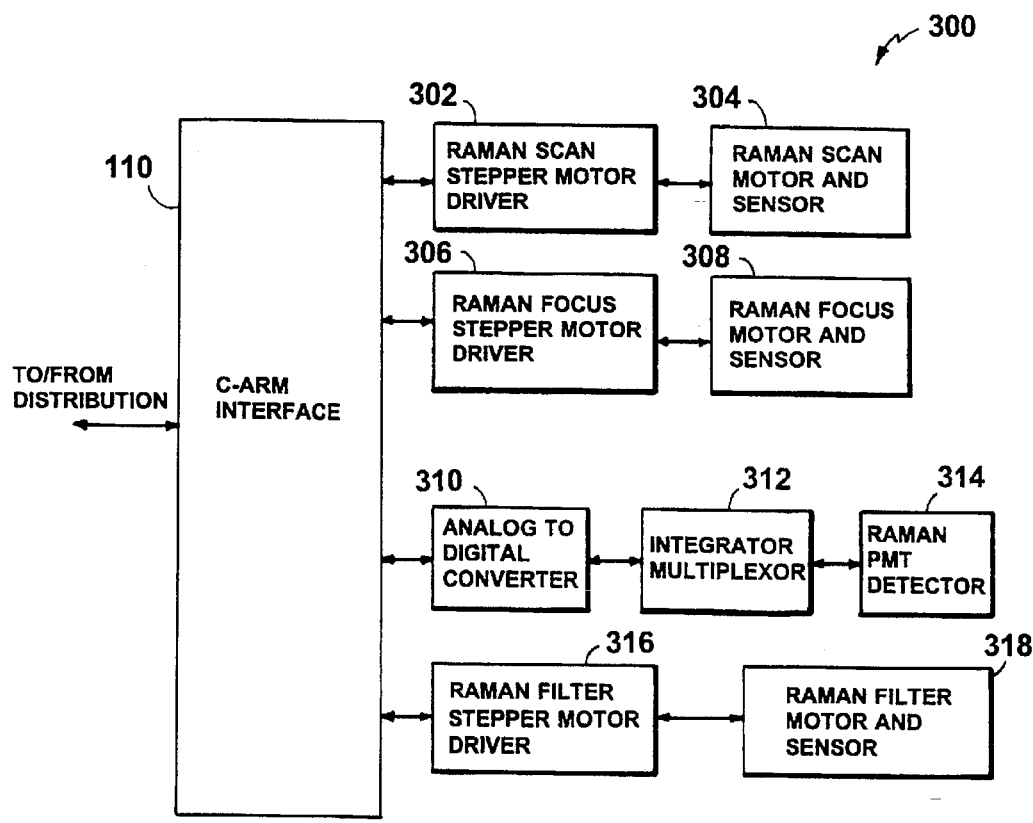

Referring to FIG. 4C, Raman probe 300 may be employed instead of coherent scatter probe 140 to probe surfaces of the examined items, which could not be cleared by the coherent scatter probe. Raman probe 300 has a laser source subsystem 305, an optical detector subsystem and a processor. Laser source subsystem 305 includes a laser, a scan motor 304 with an associated scan driver 302, and a focus motor 308 with an associated focus driver 306. Laser source subsystem 305 can dynamically modify the focus relative to the surface of an irregular item. The reflected/scattered optical radiation is directed to a Raman detector 305, which includes a PMT. A programmable set of optical filters are positioned in front of the PMT by a filter motor 318 controlled by a driver 316. The optical filters for the appropriate wavelengths are used for detection of specific explosives (or other contraband). Alternatively, the reflected/scattered radiation is directed to several parallel sets of optical detectors, each having a different substance specific filter; this arrangement can detect simultaneously multiple substances. Raman probe 300 utilizes different types of optical measurements described in the prior art (see (1) D. N. Batchelder, C. Cheng, I. P. Hayward, R. J. Lacey, G. D. Pitt and T. G. Sheldon, "Raman Microscopy and Direct 2-D Imaging of Explosives and Drugs", Contraband and Cargo Inspection technology International Symposium pp. 73–75. Office of National Drug Control Policy, Conference Proceedings Washington, D.C. 1992. K. Carleton, P. Nebolsine, S. Davis, J. Lakovits and R. Van Duyne, "Detection of Narcotics and Explosives by Surface-Enhanced Raman Spectroscopy," Contraband and cargo Inspection Technology International Symposium pp. 401–407. Office of National Drug Control Policy, Conference Proceedings Washington, D.C. 1992.

Alternative Embodiments

Alternatively, an infrared probe can be employed instead of the Raman probe. The infrared probe includes a IR laser source subsystem, an optical detector subsystem and a processor. An advantage of the infrared probe is a deeper penetration of the IR laser beam than the visible laser beam of the Raman probe. A suitable infrared measurement was described by D. O. Henderson and E. Silberman in "Fourier-Transform Infrared Spectroscopy Applied To Explosive Vapor Detection", Proceedings of the First International Symposium on Explosive Detection Technology, pp. 604–617, Nov. 13–15, 1991.

Alternatively, a dielectrometer probe can be employed. The dielectrometer probe uses a microwave antenna (described in U.S. Pat. Nos. 4,234,844 and 4,318,108) that excites a standing (constant or pulsed) wave of microwave energy in a fixed field of configuration directed to the suspicious objects. The microwave energy penetrates nonmetallic objects and produces a volumetric reflection coefficient. Based on the reflection coefficient, a dielectric constant and loss tangent which are material characteristics. This type of dielectrometric measurements was described by D. C. Steward and T. Yukl in "Explosive Detection Using Dielectrometry," Proceedings on the First International Symposium on Explosive Detection Technology, S. M. Khan, Ed., Nov. 13–15, 1991; and in the publications cited therein.

Alternatively, a millimeter wave (microwave) probe can be employed, instead of the coherent scatter probe, to create a two dimensional scanned image of the suspicious object. The probe uses a millimeter wave (10 GHz to few hundred GHz depending on the desired penetration) imaging system that gathers amplitude and phase data of reflected waves to reconstruct the wavefronts and create an image. This type of detection is described in detail by D. M. Sheen, D. L. McMakin, H. D. Collins, and T. E. Hall in "Near-field Millimeter Wave Imaging for weapon Detection" SPIE Vol. 1824, p. 223, 1992; and in the references cited therein.

Alternatively, the system employs an X-ray probe using an algorithm which interactively focuses inspection dependent on information gleaned from previous views and the bag topology. The algorithm involves selectively 'looking around' the bag under inspection to measure certain material parameters such as $Z_{eff}$ with much more accuracy. To achieve higher accuracy, the system selectively sets the beam angle to avoid clutter detected in previous views, and integrates the data for longer time periods to minimize statistical noise. The system 'looks around' by processing the projection image to select slice planes that have the least amount of clutter, as measured with a 'clutter' algorithm that is sensitive to rapid material property variations over a small area. These slice planes are then scanned to find a closely placed pair of pencil beam coordinates, which see different amounts of threat materials. The pencil beam coordinates are in close proximity and relatively uncluttered and thus can be used for a higher precision measurement of $Z_{eff}$ of the selected object.

The system inspects certain suspicious areas with much higher resolution and also places material-specific filters selectively in front of the source or detectors. In this type of a 'directed search', the results of previous scans point to the next area and mode of inspection. For example, in one routine, if a projection scan detects that a part of the lining looks abnormally thick with respect to the rest of the examined bag (or as compared to a stored set of bag models), the machine specifically targets this area. The geometry of the subsequent scan is chosen to maximize the cross-sectional attenuation; this greatly improves measurement of $Z_{eff}$ and estimated mass and density. Density is then calculated by measuring the areal density in the cross-sectional view divided by the length of the thickened portion wherein the length data are measured obliquely by a perpendicular scan. By concentrating the X-ray views on the targeted object as opposed to uniformly distributed angular views around the entire inspection region; the algorithm is more accurate or faster than a general CT-type scan which performs a standard cross-sectional reconstruction.

Another algorithm interactively searches for specific modalities based on shape, density, or $Zef_f$. The algorithm directs a sequence of material property scans with appropriately selected spatial resolutions and positioning to enable a flexible and targeted material property sensitive inspection. Each additional scan adds information and modifies parameters for subsequent scans for effecting a rapid convergence to a decision on a particular object. This process is performed iteratively. The algorithm can also divide spatial information of a larger bag into several regions and then iteratively process the regions in parallel.

The above-described fully automatic mode, called 'smart x-ray eyes', is an analogue to a human operator with x-ray eyes who can 'look around' the bag to notice 'abnormalities' and see and understand each indicated threat object. Alternatively, the automatic mode is enhanced by providing input from an operator at different stages of the examination. Here, the inspection system includes a graphical interface and a user interface. At different stages, the operator receives one or more images that may also include a color overlay indicating properties of the located objects or regions. Then the operator is prompted to provide optimal selection of inspection geometries for the subsequent scan. This way the algorithm utilizes the experience of a human in an interactive manner.

Another embodiment of the system utilizes a single dual energy x-ray probe and a data interface to the level 1 inspection machine. This enables the system to use the data from the level 1 device to direct the inspection process, thereby shortening the time to execute the 'level 3' inspection process.

Other embodiments are within the following claims:

We claim:

1. An inspection system for detecting a specific material of interest in items of baggage or packages, comprising:
   a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;
   an interface system constructed and arranged to receive from said X-ray inspection probe data providing said spatial information and said geometry;
   a directional, material sensitive probe connected to and receiving from said interface system said spatial information and said geometry; said material sensitive probe constructed to acquire material specific information about said suspicious region by employing said geometry; and
   a computer constructed to process said material specific information to identify presence of said specific material in said suspicious region.

2. The inspection system of claim 1 wherein said multi-view X-ray inspection probe comprises an X-ray exposure system constructed to expose said examined item at multiple locations to a fan beam of X-ray radiation; and an X-ray detection system positioned to detect X-ray radiation transmitted through or scattered from said examined item; and a processor operatively connected to receive data from said X-ray detection system programmed to identify said suspicious region.

3. The inspection system of claim 2 wherein said X-ray detection system includes an array of X-ray transmission detectors positioned to detect X-ray radiation transmitted through said examined item.

4. The inspection system of claim 2 wherein said X-ray detection system includes an array of back-scatter X-ray detectors positioned to detect X-ray radiation back-scattered from said examined item.

5. The inspection system of claim 2 wherein said X-ray detection system includes an array of forward-scatter X-ray detectors positioned to detect X-ray radiation forward-scattered from said examined item.

6. The inspection system of claim 2 wherein said X-ray exposure system generates said fan beam of X-ray radiation at least two substantially different energies.

7. The inspection system of claim 1 wherein said directional, material sensitive probe is a coherent X-ray scatter probe.

8. The inspection system of claim 7 wherein said coherent X-ray scatter probe includes an X-ray source constructed and arranged to emit a collimated pencil beam of X-rays that irradiate said suspicious region; and a position sensitive X-ray detector constructed to detect X-rays scattered from said suspicious region.

9. The inspection system of claim 8 wherein said coherent X-ray scatter probe further includes a source filter constructed and arranged to filter said collimated pencil beam.

10. The inspection system of claim 8 wherein said coherent X-ray scatter probe further includes a detector filter, located in front of said position sensitive detector, constructed to filter X-rays scattered from said suspicious region.

11. The inspection system of claim 1 further comprising a graphical interface and a display constructed to display spatial information of said examined item.

12. The inspection system of claim 1 further comprising a user interface constructed and arranged to enable interactive communication with said inspection system.

13. An inspection system for detecting a specific material of interest in items of baggage or packages, comprising:
   a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;
   an interface system constructed and arranged to receive from said X-ray inspection probe data providing said spatial information and said geometry;
   a material sensitive probe connected to and receiving from said interface system said spatial information and said geometry; said material sensitive probe constructed to acquire material specific information about said suspicious region by employing said geometry; and a computer constructed to process said material specific information to identify presence of said specific material in said suspicious region.

14. The inspection system of claim 13 wherein said material sensitive probe is one of the following: a Compton X-ray scatter probe, a Raman probe, an infrared probe, an NQR probe, a dielectrometer probe, a millimeter wave (microwave) probe.

15. An X-ray inspection method of detecting a specific material of interest in items of baggage or packages, comprising:

employing X-ray radiation transmitted through or scattered from an examined item to obtain multi-view spatial information about the examined item;

identifying from said spatial information a suspicious region inside said examined item, said identifying step being performed by employing several examination angles of said transmitted or scattered X-ray radiation;

determining a geometry for subsequent examination;

employing a directional, material sensitive probe using said geometry to acquire material specific information about said suspicious region; and identifying, based on computer-processing, presence of said specific material in said suspicious region.

16. The X-ray inspection method of claim 15 wherein said employing and identifying steps comprise exposing said examined item, at multiple locations and examination angles, to a fan beam of X-ray radiation;

detecting X-ray radiation transmitted through or scattered from said examined item; and processing detected X-ray data to identify said suspicious region.

17. The X-ray inspection method of claim 16 wherein said step of detecting X-ray radiation includes detecting X-ray radiation transmitted through said examined item.

18. The X-ray inspection method of claim 16 wherein said step of detecting X-ray radiation includes detecting X-ray radiation back-scattered from said examined item.

19. The X-ray inspection method of claim 16 wherein said step of detecting X-ray radiation includes detecting X-ray radiation forward-scattered from said examined item.

20. The X-ray inspection method of claim 16 wherein said exposing step is performed by generating at least two substantially different energies of said fan beam.

21. The X-ray inspection method of claim 15 wherein said step of employing said directional, material sensitive probe includes irradiating said suspicious region by a focused beam of X-rays and detecting coherently scattered X-rays to acquire material specific X-ray data.

22. The X-ray inspection method of claim 21 wherein said irradiating step includes emitting a collimated pencil beam of X-rays toward said suspicious region.

23. The X-ray inspection method of claim 21 wherein said detecting step includes employing a position sensitive X-ray detector.

24. The X-ray inspection method of claim 21 wherein said detecting step includes employing an energy sensitive X-ray detector.

25. The X-ray inspection method of claim 21 further includes filtering said collimated pencil beam.

26. The X-ray inspection method of claim 21 further includes filtering X-rays scattered from said suspicious region.

27. The X-ray inspection method of claim 15 further includes displaying spatial information of said examined item.

28. The X-ray inspection method of claim 15 further includes receiving commands from an operator via a user interface.

29. An X-ray inspection method of detecting a specific material of interest in items of baggage or packages, comprising:

employing X-ray radiation transmitted through or scattered from a examined item to obtain multi-view spatial information about the examined item;

identifying from said spatial information a suspicious region inside said examined item, said identifying step being performed by employing several examination angles of said transmitted or scattered X-ray radiation;

determining a geometry for subsequent examination;

employing a material sensitive probe using said geometry to acquire material specific information about said suspicious region; and identifying, based on computer-processing, presence of said specific material in said suspicious region.

30. The X-ray inspection method of claim 29 wherein said step of employing said material sensitive probe includes utilizing one of the following: a Compton X-ray scattered radiation, a Raman spectrum, an infrared spectrum, a nuclear quadrupole resonance effect, a wave of microwave energy modified by dielectric material property, and reflected millimeter wave (microwave) field.

31. The X-ray inspection method of claim 15 wherein said identifying step further includes identifying an object in said item;

selecting a measurement angle for said X-ray radiation;

measuring a value of a material parameter of said object; and comparing said measured value to a selected value of said material parameter to identify said suspicious region.

32. The X-ray inspection method of claim 31 wherein said material parameter is one of the following: $Z_{eff}$, mass, and density.

33. The X-ray inspection method of claim 15 wherein said identifying step further includes identifying an object inside of said item;

selecting coordinates for a pencil beam of X-ray radiation;

measuring a value of a material parameter of said object by employing said pencil beam; and comparing said measured value to a selected value of said material parameter to identify said suspicious region.

34. The X-ray inspection method of claim 33 wherein said material parameter is one of the following: $Z_{eff}$, mass, and density.

35. The X-ray inspection method of claim 15 wherein said determining step includes finding, based on said examination angles, spatial coordinates for an X-ray pencil beam used for said subsequent examination.

36. The X-ray inspection method of claim 15 wherein said determining step includes performing, based on said examination angles, at least a partial reconstruction of objects in said suspicious region;

displaying an image of said objects; and receiving from a user an input signal comprising information about said geometry.

37. The X-ray inspection method of claim 15 wherein said determining step includes performing, based on said examination angles, at least a partial reconstruction of objects in said suspicious region; and calculating said geometry based on said partial reconstruction.

38. The inspection system of claim 12 wherein said user interface is further constructed to receive an input from a user providing information about said geometry.

39. The inspection system of claim 13 further comprising a graphical interface, a display and a user interface constructed and arranged to display an image of objects in said suspicious region and receive an input from a user providing information about said geometry.

* * * * *

(12) EX PARTE REEXAMINATION CERTIFICATE (6850th)
United States Patent
Krug et al.

(10) Number: US 5,642,393 C1
(45) Certificate Issued: Jun. 2, 2009

(54) DETECTING CONTRABAND BY EMPLOYING INTERACTIVE MULTIPROBE TOMOGRAPHY

(75) Inventors: Kristoph D. Krug, Framingham, MA (US); Michael Ellenbogen, West Newton, MA (US); Paul J. Hurd, Norfolk, MA (US); John O. Tortora, Westford, MA (US)

(73) Assignee: L-3 Communications Security and Detection Systems Corporation Delaware, Woburn, MA (US)

Reexamination Request:
No. 90/007,561, May 27, 2005

Reexamination Certificate for:
Patent No.: 5,642,393
Issued: Jun. 24, 1997
Appl. No.: 08/533,956
Filed: Sep. 26, 1995

(51) Int. Cl.
*G01V 5/00* (2006.01)

(52) U.S. Cl. .................... 378/57; 378/53; 378/90; 376/159

(58) Field of Classification Search ............ 378/87, 378/178, 179, 197; 356/301
See application file for complete search history.

(56) References Cited

U.S. PATENT DOCUMENTS

| | | | |
|---|---|---|---|
| 3,281,598 A | * | 10/1966 | Hollstein ........... 378/179 |
| 3,678,278 A | | 7/1972 | Peil |
| 3,832,545 A | | 8/1974 | Bartko |
| 3,840,747 A | | 10/1974 | Macovski |
| 3,843,881 A | | 10/1974 | Barton, Jr. et al. |
| 3,848,130 A | | 11/1974 | Macovski |
| 3,884,816 A | | 5/1975 | Takahashi |
| RE28,544 E | | 9/1975 | Stein |
| 3,919,467 A | | 11/1975 | Peugeot |
| 3,924,064 A | | 12/1975 | Nomura et al. |
| 3,924,129 A | | 12/1975 | LeMay |
| 3,944,830 A | | 3/1976 | Dissing |
| 3,996,471 A | | 12/1976 | Fletcher et al. |
| 4,020,346 A | | 4/1977 | Dennis |

(Continued)

FOREIGN PATENT DOCUMENTS

| | | |
|---|---|---|
| EP | 0 459 648 A1 | 12/1991 |
| EP | 0 816 873 A1 | 1/1998 |
| EP | 0 825 457 A2 | 2/1998 |
| GB | 2 287 163 A | 9/1995 |
| WO | WO 96/13839 A1 | 5/1996 |
| WO | WO 97/18462 | 5/1997 |

OTHER PUBLICATIONS

Ott, A Broader Plan, Not a 'Silver Bullet', *Aviation Week & Space Technology*, pp. 32–34, Oct. 7, 1996.

(Continued)

*Primary Examiner*—Christopher E. Lee

(57) ABSTRACT

An inspection system for detecting a specific material of interest in items of baggage or packages includes a multi-view X-ray inspection probe and one or more material sensitive probes. The multi-view X-ray inspection probe employs X-ray radiation transmitted through or scattered from an examined item to identify a suspicious region inside the item. An interface is used to receive from said X-ray inspection probe X-ray data providing spatial information about the suspicious region and to provide this information to a selected material sensitive probe. The material sensitive probe then acquires material specific information about the previously-identified suspicious region and provides it to a computer. The computer uses a high level detection algorithm to identify presence of the specific material in the suspicious region. The material sensitive probe may be a directional probe such as a coherent scatter probe, or a non-directional probe such as a Compton scatter probe or an NQR probe. The detection algorithm can automatically employ the different probes operating in a preferred geometry. The inspection system may also include a graphical interface and an operator interface that enable interactive communication with the detection algorithm.

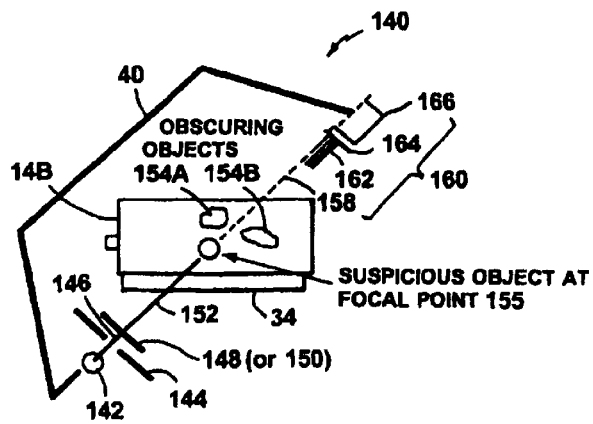

U.S. PATENT DOCUMENTS

| Patent No. | | Date | Inventor(s) | Ref |
|---|---|---|---|---|
| 4,029,963 | A | 6/1977 | Alvarez et al. | |
| 4,047,035 | A | 9/1977 | Dennhoven et al. | |
| 4,064,440 | A | 12/1977 | Roder | |
| 4,070,581 | A | 1/1978 | Gibbons et al. | |
| 4,075,492 | A | 2/1978 | Boyd et al. | |
| 4,138,721 | A | 2/1979 | Boyd | |
| 4,139,771 | A | 2/1979 | Dennhoven et al. | |
| 4,210,811 | A | 7/1980 | Dennhoven et al. | |
| 4,216,499 | A | 8/1980 | Kunze et al. | |
| 4,217,641 | A | 8/1980 | Naparstek | |
| 4,229,656 | A * | 10/1980 | Iversen et al. | 378/178 |
| 4,247,774 | A | 1/1981 | Brooks | |
| 4,255,664 | A | 3/1981 | Rutt et al. | |
| 4,315,157 | A | 2/1982 | Barnes | |
| 4,366,382 | A | 12/1982 | Kotowski | |
| 4,430,568 | A | 2/1984 | Yoshida et al. | |
| 4,454,605 | A | 6/1984 | DeLucia | |
| 4,463,375 | A | 7/1984 | Macovski | |
| 4,530,006 | A | 7/1985 | Blaustein et al. | |
| 4,539,648 | A | 9/1985 | Schatzki | |
| 4,549,307 | A | 10/1985 | Macovski | |
| 4,566,113 | A | 1/1986 | Donges et al. | |
| 4,578,803 | A | 3/1986 | Macovski | |
| 4,580,219 | A | 4/1986 | Pelc et al. | |
| 4,590,558 | A | 5/1986 | Glover et al. | |
| 4,599,740 | A | 7/1986 | Cable | |
| 4,639,943 | A | 1/1987 | Heinze et al. | |
| 4,641,331 | A | 2/1987 | Maknio et al. | |
| 4,644,573 | A | 2/1987 | Palermo et al. | |
| 4,644,578 | A | 2/1987 | Paolini | |
| 4,649,483 | A | 3/1987 | Dixon, Jr. | |
| 4,686,695 | A | 8/1987 | Macovski | |
| 4,688,238 | A | 8/1987 | Sprunt et al. | |
| 4,709,333 | A | 11/1987 | Crawford | |
| 4,722,095 | A | 1/1988 | Muegge et al. | |
| 4,731,807 | A | 3/1988 | Plessis et al. | |
| 4,736,401 | A | 4/1988 | Donges et al. | |
| 4,748,649 | A | 5/1988 | Griesmer et al. | |
| 4,751,722 | A | 6/1988 | Harding et al. | 378/6 |
| 4,756,015 | A | 7/1988 | Doenges et al. | |
| 4,759,047 | A | 7/1988 | Donges et al. | |
| 4,782,501 | A | 11/1988 | Dixon, Jr. | |
| 4,783,794 | A | 11/1988 | Dietrich | |
| 4,788,704 | A | 11/1988 | Donges et al. | |
| 4,788,705 | A | 11/1988 | Anderson | |
| 4,799,247 | A * | 1/1989 | Annis et al. | 378/87 |
| 4,799,382 | A | 1/1989 | Sprunt et al. | |
| 4,803,639 | A | 2/1989 | Steele et al. | |
| 4,817,121 | A | 3/1989 | Shimizu et al. | |
| 4,827,528 | A | 5/1989 | Macovski | |
| 4,841,554 | A | 6/1989 | Doenges et al. | |
| 4,844,290 | A | 7/1989 | Tamura et al. | |
| 4,851,984 | A | 7/1989 | Doi et al. | |
| 4,864,142 | A | 9/1989 | Gomberg | |
| 4,870,670 | A | 9/1989 | Geus | |
| 4,879,735 | A | 11/1989 | Owens | |
| 4,933,960 | A | 6/1990 | Fujisaki | |
| 4,941,162 | A | 7/1990 | Vartsky et al. | |
| 4,957,250 | A | 9/1990 | Hararat-Tehrani | |
| 4,969,110 | A | 11/1990 | Little et al. | |
| 4,980,923 | A | 12/1990 | Kawamoto et al. | |
| 4,987,584 | A | 1/1991 | Doenges | |
| 5,016,173 | A | 5/1991 | Kenet et al. | |
| 5,031,226 | A | 7/1991 | Delange | |
| 5,038,371 | A * | 8/1991 | Janssen et al. | 378/197 |
| 5,044,003 | A | 8/1991 | Zuidhof | |
| 5,063,509 | A | 11/1991 | Coles et al. | |
| 5,070,519 | A | 12/1991 | Stein et al. | |
| 5,073,782 | A | 12/1991 | Huguenin et al. | |
| 5,078,952 | A | 1/1992 | Gozani et al. | |
| 5,098,640 | A | 3/1992 | Gozani et al. | |
| 5,109,691 | A | 5/1992 | Corrigan et al. | |
| 5,125,015 | A | 6/1992 | Shimoni et al. | |
| 5,132,998 | A | 7/1992 | Tsutsui et al. | |
| 5,133,020 | A | 7/1992 | Giger et al. | |
| 5,162,652 | A | 11/1992 | Cohen et al. | |
| 5,164,590 | A | 11/1992 | Coles et al. | |
| 5,182,764 | A | 1/1993 | Peschmann et al. | 378/57 |
| 5,243,664 | A | 9/1993 | Tuy | |
| 5,299,116 | A | 3/1994 | Owens et al. | |
| 5,323,004 | A | 6/1994 | Ettinger et al. | |
| 5,367,552 | A | 11/1994 | Peschmann | 378/57 |
| 5,420,905 | A | 5/1995 | Bertozzi | |
| 5,490,218 | A | 2/1996 | Krug et al. | |
| 5,524,133 | A | 6/1996 | Neale et al. | |
| 5,570,403 | A | 10/1996 | Yamazaki et al. | |
| 5,583,903 | A | 12/1996 | Saito et al. | |
| 5,600,303 | A | 2/1997 | Husseiny et al. | |
| 5,600,700 | A | 2/1997 | Krug et al. | |
| 5,642,393 | A | 6/1997 | Krug et al. | |
| 5,661,774 | A | 8/1997 | Gordon et al. | |
| 5,692,029 | A | 11/1997 | Saito et al. | |
| 5,712,926 | A | 1/1998 | Eberhard et al. | |
| 5,805,660 | A | 9/1998 | Perion et al. | |
| 5,838,758 | A | 11/1998 | Krug et al. | |
| 5,909,478 | A | 6/1999 | Polichar et al. | |
| 5,933,471 | A | 8/1999 | Kalvin | |
| 5,974,111 | A | 10/1999 | Krug et al. | |
| 6,014,628 | A | 1/2000 | Kovarik, Jr. | |
| 6,018,562 | A | 1/2000 | Willson | |
| 6,076,400 | A | 6/2000 | Bechwati et al. | |
| 6,088,423 | A | 7/2000 | Krug et al. | |
| 6,094,472 | A | 7/2000 | Smith | |
| 6,118,850 | A | 9/2000 | Mayo et al. | |
| 6,163,591 | A | 12/2000 | Benjamin | |
| 6,185,272 | B1 | 2/2001 | Hiraoglu et al. | |
| 6,198,795 | B1 | 3/2001 | Naumann et al. | |
| 6,218,943 | B1 | 4/2001 | Ellenbogen | |
| 6,272,230 | B1 | 8/2001 | Hiraoglu et al. | |
| 6,335,957 | B1 | 1/2002 | DiBianca | |
| 6,345,113 | B1 | 2/2002 | Crawford et al. | |
| 2002/0176531 | A1 | 11/2002 | McClelland et al. | |
| 2002/0186862 | A1 | 12/2002 | McClelland et al. | |

OTHER PUBLICATIONS

Edwards, "Baggage Reconciliation, Bar–Codes & Aircraft Bombers," *Intersec,* vol. 4, issue 2, pp. 48–50, Feb. 1994.

"Proceeding of the Second Explosives Detection Technology Symposium and Aviation Security Technology Conference," Federal Aviation Administration, Nov. 12–15, 1996 (Table of Contents Only).

Demkovich, Memorandum, titled "BHS Evaluation," AvAir-Pros Services Inc., Oct. 17, 2000 pp. 1–4.

"International Standards and Recommended Practices, Security, Safeguarding International Civil Aviation Against Acts of Unlawful Interference," Annex 17 to the Convention on International Civil Aviation, Fifth Edition, Dec. 1992, pp. i–viii and 1–21.

"Santiago International Airport, Chile, Baggage Handling System 1999–2002," case study, Glidepath, oct. 2003, pp. 1–9.

"FKI Logistex Teams with Delta Air Lines, Transportation Security Administration to Text Enhanced RFID Baggage Tracking Technology," Automation.com, Jul. 28, 2003. (4 pages).

Jackson, "The Journey of a Suitcase," Evolution—the business and technology magazine from SKF, available at www.skf.com, May 15, 2000. (3 pages).

"Request for Proposal ARGUS Explosive Detection System (EDS)," United States Department of Transportation, federal Aviation Administration, Solicitation No. 99.1 Jul. 28, 1999, pp. 1–20.

Sire et al., "X–ray cone beam CT system Calibration," SPIE vol., 2009, X–Ray Detector Physics and Applications II (1993), pp. 229–239.

Costello, "X–ray and gamma–ray computed tomography for industrial non–destructive testing and evaluation," SPIE vol., 2092, Substance Detection Systems (1993), pp. 460–469.

Ries, "Two–level X–ray based explosives detection system," SPIE vol. 2278, X–ray and UV Detectors (1994), pp. 58–63.

Schafrik, "Explosive Detection Technology for Commercial Aviation Security," SPIE vol. 2102, Coupling Technology to National Need (1993), pp. 323–332.

BNP Associates, Inc. Beers Skanska, Baggage Handling System Specifications, pp. 223–231, Nov. 11, 2002.

IATA, Passenger Services Conference Resolutions Manual $24^{th}$ Ed. June 2004, Recommended Practice 1745 (66 pages).

IATA Baggage Services Manual, $6^{th}$ Ed. Apr. 1, 2003, pp. 1–175.

Roder, "Image processing requirements for computed tomographic explosives detection," SPIE vol. 1824 (1992) pp. 30–38.

Roder, "Explosives Detection by Dual–Energy Computed Tomography (CT)" SPIE, vol. 182 Imagig Application for Automated Industrial Inspection & Assembly (1979) pp. 171–177.

"Proceeding of the First International Symposium on Explosives Detection Technology," Federal Aviation Administration, Nov. 13–15, 1991. pp. i–xv and 1–434.

QDR Security, A Plan to Develop, Manufacture and Sell an X–Ray Security Inspection System, March 1989.

QDR4500, "X–Ray Bone Densitometer User's Guide," Document No. 080–0451 Revision B, Jan. 12, 1995.

Huang, "Final Report, New Detection Concept, Phase II, Submitted to FAA Technical Center under FAA Contract No. 03–85–C–00037," Jun. 22, 1999.

"PACS has Arrived," *Scar News,* vol. 8, issue 3, pp. 1–2, Jul. 1997.

Kolla, Peter, "Detecting Hidden Explosives," Analytical Chemistry, vol. 67, No. 5, Mar. 1, 1995, pp. 184–189.

Roder, Fredrick, L., The Aerospace Corporation, Washington, D.C. Proceedings, New Concepts Symposium and Workshop on Detection and Identification of Explosives, October 30, 31 and Nov. 1, 1978, Reston, Va.

Speller, et al., "X–Ray Scattering Signatures For Material Identification," SPIE vol. 2092, dated 1993, pp. 360–377.

Luggar et al., Industrial Potential of Rayleigh Scattered X–Rays For Identification of Low–Z Materials, SPIE vol. 2092, dated 1993, pp. 378–386.

Strecker, et al., Detection of Explosives in Airport Baggage Using Coherent X–Ray Scatter, SPIE, vol. 2092, dated 1993, pp. 399–410.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are cancelled.

Claims 2, 7, 11, 12, 14, 15, 29, 30 and 39 are determined to be patentable as amended.

Claims 3–6, 8–10, 16–28 and 31–38, dependent on an amended claim, are determined to be patentable.

New claims 40–57 are added and determined to be patentable.

2. The inspection system of claim [1] *57* wherein said multi-view X-ray inspection probe comprises
 an X-ray exposure system constructed to expose said examined item at multiple locations to a fan beam of X-ray radiation; and
 an X-ray detection system positioned to detect X-ray radiation transmitted through or scattered from said examined item; and
 a processor operatively connected to receive data from said X-ray detection system programmed to identify said suspicious region.

7. The inspection system of claim [1] *57* wherein said directional, material sensitive probe is a coherent X-ray scatter probe.

11. The inspection system of claim [1] *57* further comprising a graphical interface and a display constructed to display spatial information of said examined item.

12. The inspection system of claim [1] *57* further comprising a user interface constructed and arranged to enable interactive communication with said inspection system.

14. [The inspection system of claim 13] *An inspection system for detecting a specific material of interest in items of baggage or packages, comprising:*
 *a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;*
 *an interface system constructed and arranged to receive from said X-ray inspection probe data providing said spatial information and said geometry;*
 *a material sensitive probe connected to and receiving from said interface system said spatial information and said geometry; said material sensitive probe constructed to acquire material specific information about said suspicious region by employing said geometry; and*
 *a computer constructed to process said material specific information to identify presence of said specific material in said suspicious region,*
 *wherein said material sensitive probe is one of the following: a Compton X-ray scatter probe, a Raman probe, an infrared probe, an NQR probe, a dielectrometer probe, a millimeter wave (microwave) probe.*

15. An X-ray inspection method of detecting a specific material of interest in items of baggage or packages, comprising:
 employing X-ray radiation transmitted through or scattered from an examined item to obtain multi-view spatial information about the examined item;
 identifying from said spatial information a suspicious region inside said examined item, said identifying step being performed by employing several examination angles of said transmitted or scattered X-ray radiation;
 determining a geometry for subsequent examination based on the multi-view spatial information, *the geometry being determined to minimize interaction between a directional, material sensitive probe and objects in the examined item outside the suspicious region*;
 employing [a] *the* directional, material sensitive probe using said geometry to acquire material specific information about said suspicious region; and
 identifying, based on computer-processing, presence of said specific material in said suspicious region.

29. An X-ray inspection method of detecting a specific material of interest in items of baggage or packages, comprising:
 employing X-ray radiation transmitted through or scattered from [a] *an* examined item to obtain multi-view spatial information about the examined item;
 identifying from said spatial information a suspicious region inside said examined item, said identifying step being performed by employing several examination angles of said transmitted or scattered X-ray radiation;
 determining a geometry for subsequent examination *based on the multi-view spatial information, the geometry being determined to substantially avoid interaction between a material sensitive probe and objects in the examined item outside the suspicious region*;
 employing [a] *the* material sensitive probe using said geometry to acquire material specific information about said suspicious region; and
 identifying, based on computer-processing, presence of said specific material in said suspicious region.

30. [The X-ray inspection method of claim 29] *An X-ray inspection method of detecting a specific material of interest in items of baggage or packages, comprising:*
 *employing X-ray radiation transmitted through or scattered from an examined item to obtain multi-view spatial information about the examined item;*
 *identifying from said spatial information a suspicious region inside said examined item, said identifying step being performed by employing several examination angles of said transmitted or scattered X-ray radiation;*
 *determining a geometry for subsequent examination;*
 *employing a material sensitive probe using said geometry to acquire material specific information about said suspicious region; and*
 *identifying, based on computer-processing, presence of said specific material in said suspicious region,*
 wherein said step of employing said material sensitive probe includes utilizing one of the following: a Compton X-ray scattered radiation, a Raman spectrum, an infrared spectrum, a nuclear quadrupole resonance effect, a wave of microwave energy modified by dielectric material property, and reflected millimeter wave (microwave) field.

39. The inspection system of claim [13] *40* further comprising a graphical interface, a display and a user interface constructed and arranged to display an image of objects in said suspicious region and receive an input from a user providing information about said geometry.

*40. An inspection system for detecting a specific material of interest in items of baggage or packages, comprising:*

*a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;*

*an interface system constructed and arranged to receive from said X-ray inspection probe data providing said spatial information and said geometry;*

*a material sensitive probe connected to and receiving from said interface system said spatial information and said geometry; said material sensitive probe constructed to acquire material specific information about said suspicious region by employing said geometry; and*

*a computer constructed to process said material specific information to identify presence of said specific material in said suspicious region,*

*wherein the geometry defines an orientation of the material sensitive probe to probe the suspicious region, the orientation being selected to substantially avoid objects in the examined item outside the suspicious region.*

*41. The inspection system of claim 40, wherein the material sensitive probe comprises an X-ray source configured to rotate into a position to generate a beam at the suspicious region while substantially avoiding the objects in the examined items outside the suspicious region.*

*42. The inspection system of claim 40, wherein the geometry defines a focus of the material sensitive probe, the focus focusing the material sensitive probe on the suspicious region while the material sensitive probe is in the orientation.*

*43. The inspection system of claim 40, wherein:*

*the material sensitive probe is positionable in at least three dimensions; and*

*the geometry specifies the position of the material sensitive probe in the at least three dimensions.*

*44. The inspection system of claim 40, wherein:*

*the inspection system further comprises a C-arm including the material sensitive probe; and*

*the geometry defines a rotational position of the C-arm.*

*45. The inspection system of claim 40, wherein:*

*the examined item comprises an item of baggage; and*

*the specific material of interest is an explosive, so that the material sensitive probe is constructed to identify an explosive in the item of baggage.*

*46. An inspection system for detecting a specific material of interest in items of baggage or packages, comprising:*

*a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;*

*an interface system constructed and arranged to receive from said X-ray inspection probe data providing said spatial information and said geometry;*

*a material sensitive probe connected to and receiving from said interface system said spatial information and said geometry; said material sensitive probe constructed to acquire material specific information about said suspicious region by employing said geometry; and a computer constructed to process said material specific information to identify presence of said specific material in said suspicious region, wherein:*

*the material sensitive probe further comprises a programmable collimator and an X-ray source; and*

*the material sensitive probe is further constructed to acquire the material specific information using the geometry by applying the programmable collimator to the X-ray source.*

*47. An inspection system for detecting a specific material of interest in items of baggage or packages, comprising:*

*a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;*

*an interface system constructed and arranged to receive from said X-ray inspection probe data providing said spatial information and said geometry;*

*a directional, material sensitive probe connected to and receiving from said interface system said spatial information and said geometry; and material sensitive probe constructed to acquire material specific information about said suspicious region by employing said geometry; and*

*a computer constructed to process said material specific information to identify presence of said specific material in said suspicious region,*

*wherein the material sensitive probe comprises a Raman probe and/or an infrared probe and/or a dielectrometer probe, and/or a millimeter wave (microwave) probe.*

*48. The X-ray inspection method of claim 15, wherein employing a directional, material sensitive probe comprises employing a Raman probe and/or an infrared probe and/or a dielectrometer probe and/or a millimeter wave (microwave) probe.*

*49. The X-ray inspection method of claim 29, wherein:*

*the examined item comprises an item of baggage; and*

*the specific material of interest is an explosive, so that identifying presence of said specific material comprises identifying an explosive in the item of baggage.*

*50. The X-ray inspection method of claim 29, wherein employing a material sensitive probe using said geometry* comprises positioning the material sensitive probe in an orientation to probe the suspicious region, the orientation being selected to substantially avoid objects in the examined item outside the suspicious region.

51. The X-ray inspection method of claim 50, wherein positioning the material sensitive probe comprises rotating into the orientation an X-ray source generating a beam.

52. The X-ray inspection method of claim 50, wherein employing a material sensitive probe using said geometry further comprises focusing the material sensitive probe on the suspicious region while the material sensitive probe is in the orientation.

53. The X-ray inspection method of claim 29, wherein:

the material sensitive probe is positionable in at least three dimensions; and the geometry specifies the position of the material sensitive probe in the at least three dimensions.

54. The X-ray inspection method of claim 29, wherein the material sensitive probe is attached to a C-arm and the geometry defines a rotational position of the C-arm.

55. The X-ray inspection method of claim 29, wherein employing a directional, material sensitive probe using said geometry comprises:

applying a programmable collimator to an X-ray source.

56. The X-ray inspection method of claim 29, wherein employing X-ray radiation to obtain the multi-view spatial information about the examined item comprises taking only a limited number of radial views.

57. An inspection system for detecting a specific material of interest in items of baggage or packages, comprising:

a multi-view X-ray inspection probe constructed to employ X-ray radiation transmitted through or scattered from an examined item to identify a suspicious region inside said examined item; said multi-view X-ray inspection probe constructed to identify said suspicious region using several examination angles of said transmitted or scattered X-ray radiation, and also constructed to obtain spatial information of said suspicious region and to determine a geometry for subsequent examination;

an interface system constructed and arranged to receive from said X-ray inspection probe data providing said spatial information and said geometry;

a directional, material sensitive probe connected to and receiving from said interface system said spatial information and said geometry; said material sensitive probe constructed to acquire material specific information about said suspicious region by employing said geometry; and a computer constructed to process said material specific information to identify presence of said specific material in said suspicious region, wherein the geometry defines an orientation of the material sensitive probe to probe the suspicious region, the orientation being selected to substantially avoid objects in the examined item outside the suspicious region.

\* \* \* \* \*